Feb. 28, 1961   R. M. HIRSCH   2,973,408
PHOSPHOR-BELT RECORDER-REPRODUCER
Filed Nov. 24, 1958   2 Sheets-Sheet 1
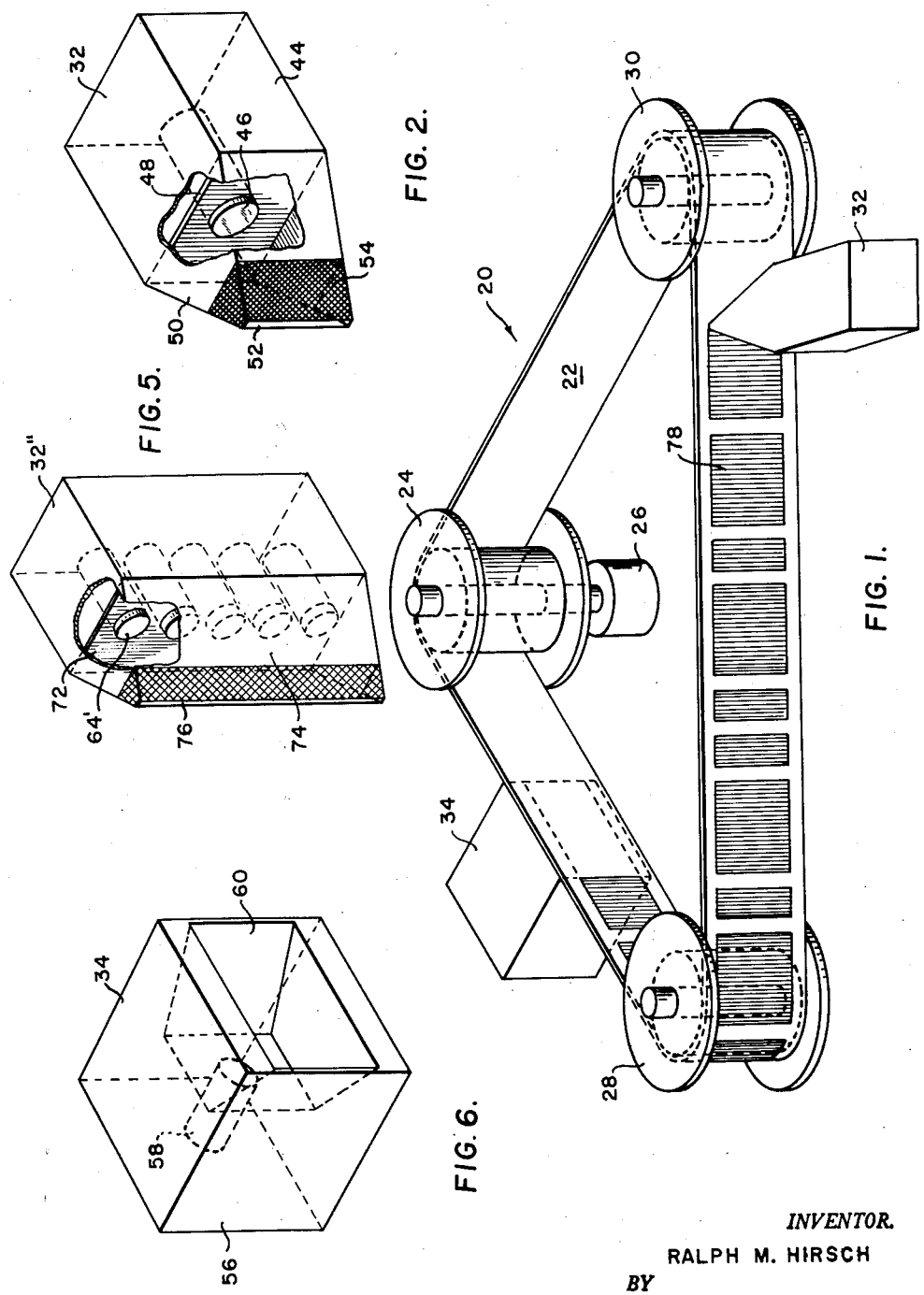
INVENTOR.
RALPH M. HIRSCH
BY
B. L. Zangwill
ATTORNEYS.

INVENTOR.
RALPH M. HIRSCH
BY
B. L. Zanguill
ATTORNEYS.

United States Patent Office 2,973,408
Patented Feb. 28, 1961

2,973,408
PHOSPHOR-BELT RECORDER-REPRODUCER
Ralph M. Hirsch, 205 Sussex Road, Washington Township, Westwood, N.J.

Filed Nov. 24, 1958, Ser. No. 776,152

13 Claims. (Cl. 178—89)

(Granted under Title 35, U.S. Code (1952), sec. 266)

The invention described herein may be manufactured and used by or for the Government of the United States of America for governmental purposes without the payment of any royalties thereon or therefor.

This invention relates to a visual telegraph recording system and more particularly to a phosphor-belt, combination telegraphic recorder and reproducer.

Prior art devices for visual recording of telegraph messages, or Morse code transmissions, generally include a photographic film or some other such material upon which a permanent record is formed. The use of photographic film has the disadvantage of requiring that the film be developed which of course entails extra expense and time thereby materially reducing the usefulness of such prior art devices. Furthermore, the use of film results in a record that is non-erasable and which can not be reused as is the case with the recording medium used in the instant invention. Other prior art telegraph recording systems also produce visual records upon tapes or the like which, like photographic film has the disadvantage of producing a record that cannot be erased, thereby allowing the medium upon which the record is formed to be used over again.

In order to provide a satisfactory visual telegraphic recording means it has been found desirable to provide a medium upon which the received telegraphic signal may be visually recorded and erased if desired, whereby it may be used over and over again. The visual recording means must also be provided with means whereby an operator may separate recorded interference signals from legitimate telegraphic signals.

In accordance with the instant invention the improved telegraphic apparatus consists of a telegraph receiver connected, in accordance with one embodiment of this invention, to a decoder gating circuit. The decoder gating circuit is in turn electrically connected to an ultraviolet light source, said light source being arranged so as to direct a beam of ultra-violet light onto a phosphor belt mounted so as to be movable relative thereto. The circuitry is so arranged that an incoming signal is conducted through the decoder gating circuit, to the ultraviolet light source, causing said light source to be turned on for an interval of time corresponding to the time interval of said incoming signal, whereby the phosphor belt is rendered luminescent over a length thereof. Thus an operator may observe luminescent dots and dashes on the phosphor belt. A further embodiment of the invention substitutes a variable frequency oscillator for the decoder gating circuit, the output of said oscillator being connected to the aforementioned ultra-violet light source, which may take varying forms as hereinafter disclosed in greater detail. The latter embodiment of the invention causes the ultra-violet light to flash at a frequency corresponding to the magnitude of the incoming signal. In addition the apparatus includes an infra-red light source suitably mounted relative to the phosphor-belt so as to erase signals recorded thereon, when desired.

An object of this invention is to provide a visual telegraphic recording means.

A further object of this invention is to provide a visual telegraphic recording means wherein interference signals may be distinguished from legitimate telegraphic signals.

Another object of this invention is to provide a visual telegraphic recording apparatus having means included therein for selectively erasing said visual recording.

Still an added object of this invention is to provide a telegraphic receiver and visual recorder combination wherein the visual record of a legitimate telegraphic signal may be distinguished from a visual record of interference signals received by the apparatus.

Other objects and many of the attendant advantages of this invention will be readily appreciated as the same becomes better understood, by reference to the following detailed description when considered in connection with the accompanying drawings wherein:

Fig. 1 is a perspective, essentially schematic, diagram of a visual telegraphic recorder produced in accordance with this invention;

Fig. 2 is a perspective view, partially broken away, of one embodiment of an ultra-violet light source utilized in conjunction with this invention;

Fig. 5 is a perspective view, partially broken away, of still a further embodiment of the ultra-violet light source utilized in conjunction with this invention;

Fig. 6 is a perspective view of an infra-red light source utilized in conjunction with the instant invention;

Figure 3:
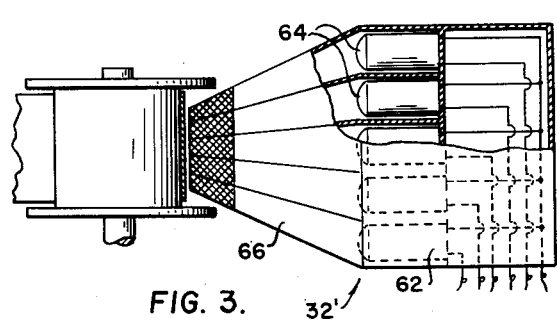
Fig. 3 is a side elevational view, partially broken away and in section, of another embodiment of the ultraviolet light source used in this invention.

Referring now to the drawings wherein like reference characters designate like or corresponding parts throughout the several views, there is shown in Fig. 1 a visual telegraphic recorder system 20. In the embodiment shown in Fig. 1, the recorder 20 comprises an endless phosphor belt 22 mounted on three rollers, one of which is a driving roller 24 to which is suitably connected a driving motor 26. The belt 22 further extends around a pair of spaced idler rollers 28 and 30, the three rollers 24, 28 and 30 maintaining the belt in a tight condition. The apparatus further includes an ultra-violet light source 32 so mounted as to project a narrow vertical beam of ultra-violet light upon the active face of the phosphor belt 22. At a point remotely removed from the ultraviolet light source 32 there is an infra-red light source 34 that projects infra-red light upon the active face of the phosphor belt thereby erasing the luminescense created on said belt by the ultra-violet source 32, thereby making it possible for the same belt to be used over and over again.

While the embodiment shown in Fig. 1 utilizes an endless phosphor belt 22, it is pointed out that said belt may be arranged in much the same manner as the tape on a conventional magnetic sound tape recorder, that is, with a pair of reels, one containing a supply of phosphor belt 22 and the other reel being a take up reel. The latter structure would of course entail somewhat different relative positions between the infra-red erasing light 34 and the ultra-violet source 32.

Figure 7:
Fig. 7 is an edge view, in section, and partially broken away, of a length of the phosphor belt utilized in this invention.
Figure 8:
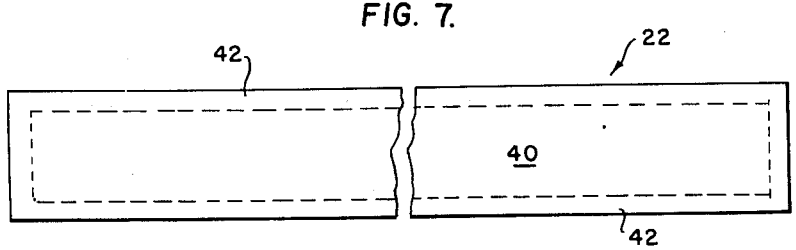
Fig. 8 is an elevational view, partially broken away, of the structure shown in Fig. 7.

While the phosphor belt 22 may take a number of forms, it is pointed out that Figures 7 and 8 disclose a preferred embodiment thereof. In accordance with the structure shown in Figs. 7 and 8, the phosphor belt 22 comprises a backing strip 36 made of kraft paper or the like having a phosphor coating 38 on one surface thereof. The belt 22 further includes a strip of clear nylon 40 superimposed on the phosphor layer 38, said nylon covering strip being either heat sealed or adhesively connected to the backing strip 36, along the respective upper and lower edges thereof and at the respective ends thereof thereby forming an enclosed area between the rear surface of said nylon strip 40 and the phosphor coating 38. The space between the nylon covering strip 40 and the phosphor coating 38 is either evacuated or filled with an inert gas to prevent undue oxidation of the phosphor coating 38.

In accordance with one embodiment of the invention the ultra-violet source 32, as shown in Fig. 2, comprises a housing 44 having an ultra-violet lamp 46 fixedly mounted therein and projecting through a reflector surface 48. A pyramid-like shield 50 extends forwardly of the ultra-violet lamp 46 and has an elongated slit 52 at the forwardmost end thereof. The interior of the forwardmost portion of the shield 50, adjacent the slit 52 is provided with an internal black coating material 54 for purposes of concentrating the light emanating from the ultra-violet bulb 46 and preventing internal reflection thereof.

The infra-red erasing lamp 34 comprises a housing 56 having an infra-red lamp 58 fixedly mounted therein and extending through a reflector 60, whereby the light from the infra-red lamp 58 diverges as it leaves the housing 56 and impinges on the belt 22.

Figure 4:
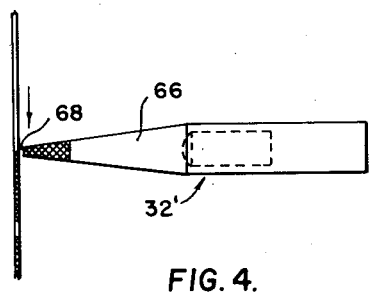
Fig. 4 is a plan view of the structure shown in Fig. 3.

While one mode of carrying out the instant invention entails the use of the single lamp, ultra-violet light source 32 as shown in Fig. 2, another mode of carrying out the invention entails the use of a modified ultra-violet light source 32′ shown in Figs. 3 and 4. The modified ultra-violet light source 32′ comprises a vertically elongated housing 62 having a plurality of ultra-violet lamps 64 mounted therein. The housing 62 is provided with a forwardly projecting pyramid-like shield 66 having an elongated slit 68 at the forward end or apex thereof. The interior of the shield 66 is provided with a plurality of spaced separators 70 affixed to the inside of the shield 66 and extending rearwardly from the slit 68 to the lamps 64, thereby providing a separate light channel for each of the ultra-violet lamps 64, for purposes hereinafter described. It is pointed out that the lamps 64 are connected in parallel with one another, and in parallel with the lamp igniting structure hereinafter described.

Still another embodiment of the ultra-violet light source is shown at 32″ in Fig. 5. The ultra-violet light source 32″ is substantially the same as the light source shown in Fig. 3, comprising a plurality of ultra-violet lamps 64′ electrically connected in parallel with one another and mounted on, and extending through a reflector member 72. The ultra-violet light source 32″ includes a forwardly extending pyramid-like member 74 attached to the forward face thereof and having a slit 76 at its apex. It is pointed out that the ultra-violet light source 32″ shown in Fig. 5 is much the same as the light source 32 shown in Fig. 2, except for the fact that the light source 32″ includes a plurality of vertically spaced ultra-violet lamp members 64′, for purposes hereinafter described.

In accordance with one embodiment of the instant invention, the combination comprises a telegraphic receiver adapted to receive Morse code transmissions, said receiver in turn being connected to an ultra-violet light source, such as 32 shown in Figs. 1 and 2. In this arrangement the fixed intensity ultra-violet source 32 is in either an off or on conduction, depending upon the absence or presence of an incoming signal. Thus when the lamp is on the phosphor belt 22 is activated thereby producing a luminescent marking 78 thereon, corresponding to the incoming signal. This system does not produce shades of gray but rather provides only black or white signals. While this arrangement is essentially satisfactory, it does have a disadvantage in that it serves to record both interference signals as well as legitimate signals, since interference signals are passed by the receiver to the fixed intensity ultra-violet lamp along with legitimate signals, with the result that it is difficult for an operator to distinguish interference signals from legitimate signals on the phosphor belt 22.

A further embodiment of the invention that is designed to overcome the disadvantage referred to above, comprises a telegraphic receiver 80 connected to a decoder gating circuit 82 adapted to selectively pass signals of varying intensity said gating circuit being electrically connected, in accordance with one embodiment, to the ultra-violet light arrangement 32′ shown in Fig. 3. In accordance with this embodiment, an incoming signal is compared with a series of thresholds, that is, fixed references. When the signal intensity reaches the first threshold, the gating circuit 82 allows said signal to pass illuminating the lowermost of the ultra-violet lamps 64, thereby producing on the phosphor belt an image equal, in the case of the structure shown in Fig. 3, to $\tfrac{1}{5}$ the length of the slot 68. When the intensity reaches a second threshold the second lowest lamp, in addition to the lowest, is caused to fire by the gating circuit 82, thereby producing a slightly longer image on the phosphor belt, and so forth, utilizing any number of lights. Thus each signal reproduced on the tape is of a fixed intensity, but the intensity of the incoming signal is established by the amplitude of the vertical representation on the phosphor belt 22. This type of picture rendition is on what may be called a staircase intensity basis rather than a linear one, since each of the images recorded on the phosphor belt is of a fixed intensity throughout its length but will be longer or shorter than others depending upon the intensity of the signal that the image represents. Accordingly an operator may separate interference signals from legitimate signals by comparing the length of the images produced on the phoshor belt 22 with the length of a set of standard images.

Figure 9:
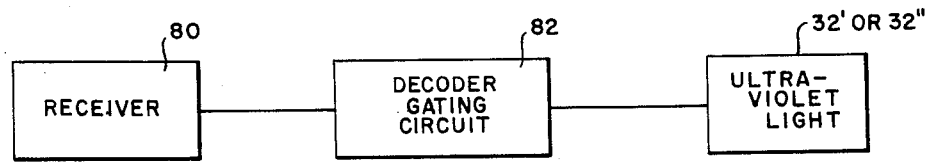
Fig. 9 is an electrical block diagram showing the electrical circuitry of the instant invention.

Again utilizing the structure shown in Fig. 9, still another embodiment of the invention consists in combining with the receiver 80 and the decoder gating circuit 82, the ultra-violet light source 32″ shown in Fig. 5, the latter having a series parallel connected ultra-violet lamps 64′ therein, the light from which is focused along a vertical line through the slot 76 in the pyramid 74 attached to the lamp housing 32″. In this structure, as in the structure described in the paragraph above, the number of lamps fired at one time depends upon the intensity of the incoming signal, that is, when the intensity reaches the first threshold the lowest light is fired; when a signal reaches a second threshold the second lowest light, in addition to the lowest, is caused to fire and so on utilizing any number of lights. Inasmuch as the individual lamps shown in Fig. 5 are not separated from one another, this embodiment of the invention produces images on the phosphor belt of varying intensities of gray, between black and white, in what might be called a staircase-intensity basis rather than a linear basis. The lamps do not vary continually in intensity, but in step increments depending upon whether one or more lamps are fired simultaneously. With this arrangement an operator compares recorded images with a group of reference images, thereby separating legitimate signals from interference signals, the comparison being on the basis of the shade of gray of the signal recorded.

Figure 10:
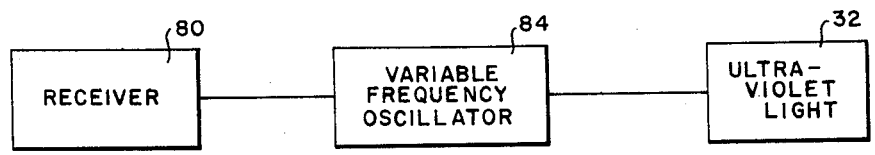
Fig. 10 shows another embodiment of the electrical circuitry utilized in carrying out the instant invention.

Still another embodiment of the invention designed to aid the operator in separating interference signals from legitimate signals, is shown in Fig. 10. In this embodiment the receiver 80 is connected to a variable frequency oscillator 84 that in turn is connected to an ultra-violet light source of fixed intensity such as 32 shown in Fig. 2. In this embodiment the intensity of an incoming signal is used to control the output frequency of the variable frequency oscillator in a conventional manner. The output of the oscillator is then used to cause the ultra-violet light source 32 to be turned on and off at the oscillator frequency. Since the tape is moving past the slit 52 on the lamp housing 32 the result is a series of vertical lines on the tape. The greater the intensity of the incoming signal, the closer together the lines are, and the result is comparable to a newspaper half-tone print; that is, the eye integrates the lines to a solid shaded figure which varies through any shade of gray from black to white. In this embodiment, as in those described above, an operator compares the images produced on the phosphor belt 22 with a set of standard images corresponding to legitimate signals thereby separating the legitimate signals from interference signals.

While various embodiments of the invention have been described above, the latter embodiment, utilizing a variable frequency oscillator in the manner described, is considered to be the preferred embodiment of the instant invention inasmuch as it produces the most satisfactory results.

While various forms of recording technique have been described above it is pointed out that only one infra-red lamp 34 is needed to erase the signal produced on the phosphor belt 22 when such erasure is desirable. The infra-red lamp 34 is suitably mounted relative to the phosphor belt at some point remotely removed from the ultra-violet source.

It is of course emphasized that the signal need not be erased and can be stored for any length of time desired.

It is emphasized that the instant invention provides a visual means for recording Morse code signals and/or teletype messages which has the advantage over conventional photographic recording in that it does not require the time, effort and cost needed to develop the film used in the prior art techniques. Furthermore, the instant invention allows a slow speed operator to copy high speed Morse code signals, and provides a means whereby an operator, by comparing the visual recording with a standard, can definitely establish which are legitimate signals and which are interference signals.

It should also be noted that the instant invention provides a psychological backup, as it were, for the operator, in that he is not so concerned about missing one character that he fails to copy those that he can read, as has been found to be the case in prior art code receiving machines.

Obviously many modifications and variations of the present invention are possible in light of the above teachings. It is therefore to be understood that within the scope of the appended claims the invention may be practiced otherwise than as specifically described.

What is claimed is:

1. A system for visually recording telegraphic signals comprising, a telegraph receiver, an ultra-violet light source connected to said receiver said light source being of fixed intensity when energized, a phosphor belt exposed to said ultra-violet light source and movable relative thereto, means connected to said receiver and said light source adapted to selectively turn on and turn off said ultra-violet light source in response to the receipt of a telegraphic signal by the receiver, and an infra-red light source mounted adjacent to said phosphor belt and having the light thereof selectively projectable thereunto, whereby images produced on said belt by said ultra-violet lamp are adapted to be erased therefrom.

2. A visual telegraphic recording system comprising, a telegraph receiver, a light sensitive member, a light source arranged to selectively shine a beam of light on said light sensitive member, means for moving said light sensitive member relative to said light source, a variable frequency oscillator connected to receive the output of said receiver, whereby the intensity of a signal received by said receiver is adapted to vary the output frequency of said oscillator, means connecting the output of said oscillator to said light source, whereby said light source is adapted to be flashed on and off at a frequency equal to the output frequency of said oscillator, whereby the image produced by the light from said light source upon said light sensitive member is a function of the strength of the signal received by said telegraphic receiver.

3. A visual telegraphic recording system as set forth in claim 2, wherein said light sensitive member comprises an elongated strip having a phosphor coating on one surface thereof and said light source comprises an ultra-violet lamp.

4. A visual telegraphic recording system comprising, a telegraphic receiver, a decoder gating circuit connected to the output of said receiver, said decoder gating circuit having means adapted to selectively pass signals of varying intensity received from said receiver, a light source connected to the output of said decoder gating circuit, said light source comprising a plurality of lamp members connected in parallel with said decoder gating circuit, means in said decoder gating circuit adapted to selectively ignite one or more of said lamps in proportion to the intensity of the signal received by said decoder gating circuit from said receiver whereby the intensity of light emanating from said light source varies directly as the intensity of the signal received by said receiver; means directing the light from said lamp onto a light sensitive member movably mounted relative to said light source whereby images produced on said light sensitive member vary in intensity from white to black in proportion to the intensity of the signal received by said receiver.

5. A visual telegraphic recording system as set forth in claim 4, wherein each of said lamp members produces an ultra-violet light, and said light sensitive member is provided with a phosphor coating on the surface thereof.

6. A visual telegraphic recorder comprising a telegraphic receiver, a decoder gating circuit connected to the output from said receiver, said decoder gating circuit having means adapted to selectively pass signals of varying intensity received from said receiver, a light source connected to the output of said decoder gating circuit, said light source comprising a row of aligned individual lamp members, a shield means projecting forwardly of said lamp members for separately channeling the light therefrom to a slit at the forward end of said shield, said lamps being connected in parallel with said decoder gating circuit, means in said decoder gating circuit adapted to selectively ignite one or more of said lamps in proportion to the intensity of the signal received from said telegraphic receiver, whereby the light emanating from said light source varies in length dependent upon the intensity of the signal received by said telergaphic receiver; a light sensitive member exposed to the light emanating from said lamps, said light sensitive member being movable relative to said light source, whereby an image is adapted to be produced on said light sensitive member having a length proportional to the intensity of the signal received by the telegraphic receiver.

7. A visual telegraphic recorder as set forth in claim 6 wherein each of said individual lamps produces an ultra-violet light, and wherein said light sensitive member is provided with a phosphor coating on the surface thereof exposed to said ultra-violet light.

8. A system for visually recording telegraphic signals comprising, a telegraph receiver, an ultra-violet light source connected to said receiver, an ultra-violet energizable phosphor belt exposed to said ultra-violet light source and movable relative thereto, said light source normally being in an off condition, and means associated with said receiver adapted to turn on said light source in response to the receipt of a telegraphic signal by said receiver, whereby a luminescent image is produced on said phosphor belt in response to the receipt of a signal by said receiver.

9. A system for visually recording telegraphic signals comprising, a telegraph receiver, an ultra-violet light source connected to said receiver, an ultra-violet energizable phosphor belt exposed to said ultra-violet light source and movable relative thereto, said light source normally being in an off condition, means associated with said receiver adapted to turn on said light source in response to the receipt of a telegraphic signal by said receiver, whereby a luminescent image is produced on said phosphor belt in response to the receipt of a signal by the receiver, and means for selectively erasing said luminescent image on said belt.

10. A system as set forth in claim 9 wherein said means for erasing the image from the phosphor belt comprises an infra-red light source directed at said belt, and means for selectively energizing said infra-red light source.

11. A visual telegraphic recording system comprising, a telegraph receiver, an ultra-violet lamp, an ultra-violet sensitive belt adapted to be selectively exposed to light from said ultra-violet lamp and thereby be rendered luminescent, means for moving said belt past said lamp, a variable frequency oscillator connected to receive the output of said receiver, whereby the intensity of a signal received by said receiver is adapted to vary the output frequency of said oscillator, means connecting the output of said oscillator to said lamp, whereby said lamp is adapted to be flashed on and off at the output frequency of said oscillator, whereby the color intensity of the image produced on the belt by the lamp is a function of the strength of the signal received by said telegraph receiver.

12. A visual telegraphic recording system comprising, a telegraph receiver, an ultra-violet lamp, an ultra-violet sensitive belt adapted to be selectively exposed to light from said ultra-violet lamp and thereby be rendered luminescent, means for moving said belt past said lamp, a variable frequency oscillator connected to receive the output of said receiver whereby the intensity of a signal received by siad receiver is adapted to vary the output frequency of said oscillator, means connecting the output of said oscillator to said lamp, whereby said lamp is adapted to be flashed on and off at a frequency equal to the output frequency of said oscillator, and whereby the color intensity of the image produced on the belt by the lamp is a function of the strength of the signal received by said telegraphic receiver, and an infra-red lamp directed at the surface of said belt, said infra-red lamp being selectively energizable to selectively erase the luminescent images produced on the belt by the ultra-violet lamp.

13. A visual telegraphic recording system as set forth in claim 12, wherein said belt comprises a first elongated strip of flexible material, a phosphor coating on that surface of the strip adapted to be exposed to said ultra-violet lamp, a second elongated strip of flexible material superimposed on said first strip and having the periphery thereof affixed to said first strip, said second strip being transparent.

References Cited in the file of this patent
UNITED STATES PATENTS

| 706,743 | Fessenden | Aug. 12, 1902 |
| 1,818,585 | Scoroter | Aug. 11, 1931 |

FOREIGN PATENTS

| 186,665 | Great Britain | Sept. 22, 1922 |